Dec. 11, 1934.  E. W. RIEMENSCHNEIDER  1,984,083
MANUFACTURE OF SHEET METAL TUBES
Filed July 1, 1931  7 Sheets-Sheet 1
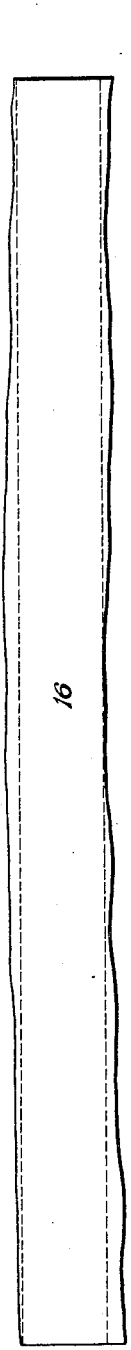
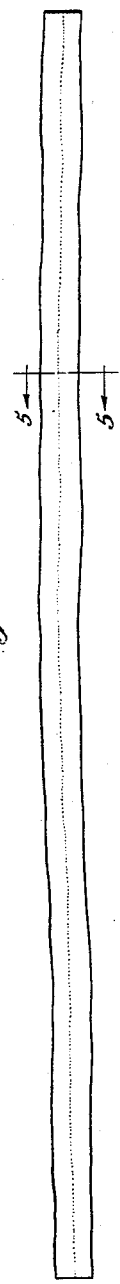
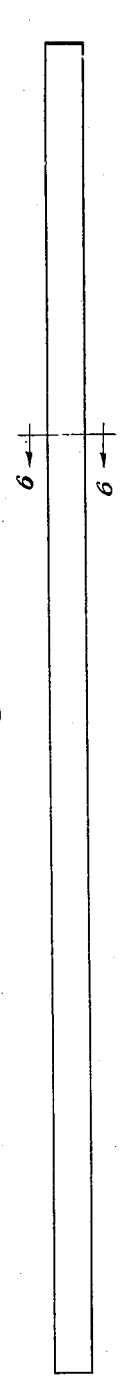
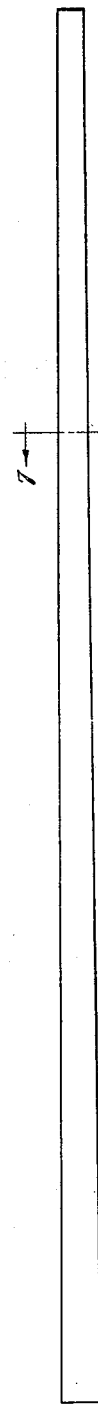
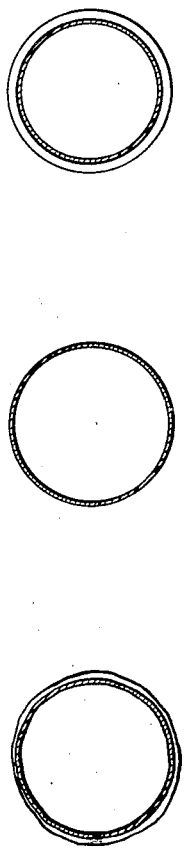
Inventor
E. W. Riemenschneider
By
Frease and Bishop
Attorneys

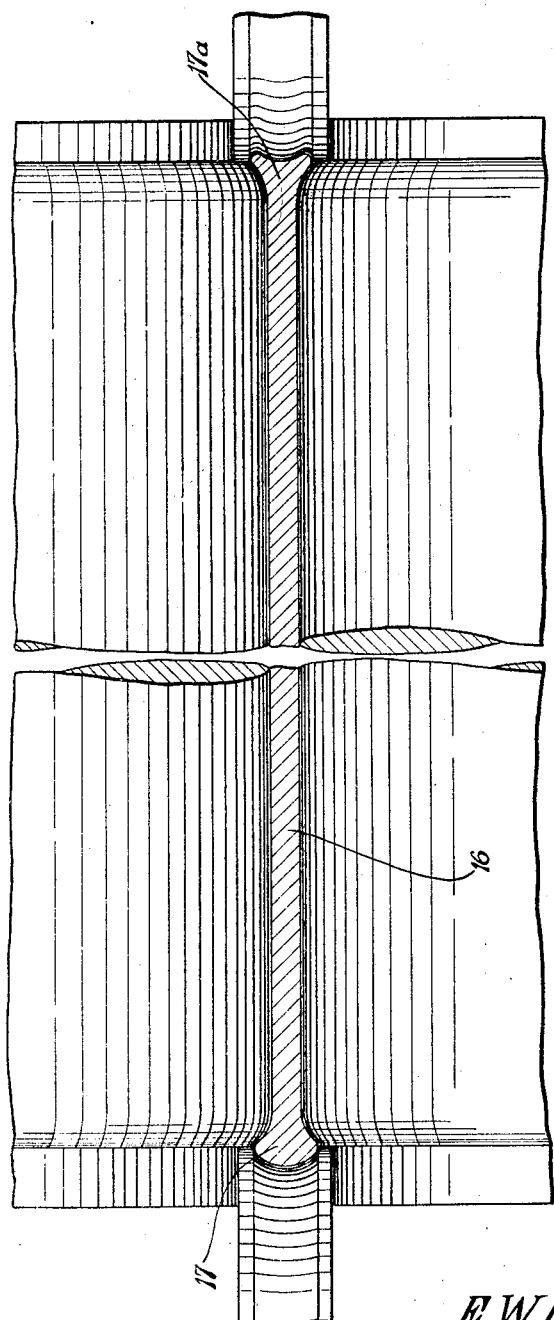

Dec. 11, 1934.  E. W. RIEMENSCHNEIDER  1,984,083
MANUFACTURE OF SHEET METAL TUBES
Filed July 1, 1931  7 Sheets—Sheet 7
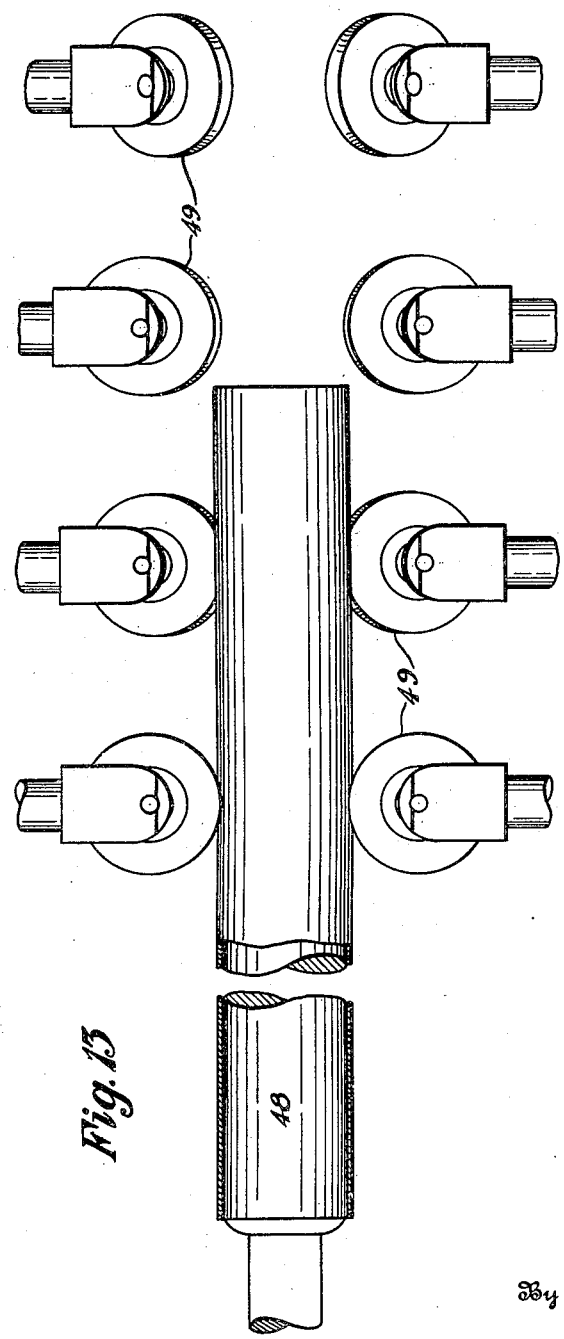
Inventor
E. W. Riemenschneider
By Frease and Bishop
Attorneys Patented Dec. 11, 1934

1,984,083

UNITED STATES PATENT OFFICE 1,984,083

MANUFACTURE OF SHEET METAL TUBES

Edmund W. Riemenschneider, Canton, Ohio, assignor to The Union Metal Manufacturing Company, Canton, Ohio, a corporation of Ohio Application July 1, 1931, Serial No. 548,106

5 Claims. (Cl. 29—156)

The invention relates to the method of making tubes, pipes, hollow poles, shafts and the like, from metal sheets, strips, stripsheets, stripplates and the like; and the general object of the improvement is to simplify and cheapen such manufacture by eliminating unnecessary and improving inadequate operations.

In the manufacture of tapered tubular shafts from sheet metal and the like, by the methods, operations and apparatus set forth in the sole and joint patents to Frahm and Riemenschneider, respectively, No. 1,605,828, No. 1,638,481, No. 1,746,281, No. 1,765,368, No. 1,765,384, and No. 1,777,080, it has been the habitual practice to make the shaft from a strip or sheet having its edges trued by slitting or trimming to form a tapered blank, so that by laterally curving the blank and abutting and welding its tapered edges together, a tapered shaft is made.

The mill edges of a commercial strip or stripsheet may be so irregular that sometimes an inch in width of metal may be wasted on each side by an edge trimming operation; and an edge trimming or strip slitting operation may so relieve strains in the rolled metal as to leave the same with a wavy edge. Moreover, there is frequently if not always such a camber or lateral curvature in a commercial strip or stripsheet, as to require edge trimming which results in a considerable waste to produce a straight edge.

It is the particular object of the present improvement to make either a cylindric or tapered tube directly from commercial strips or stripsheets, without the wasteful and otherwise objectionable operation of cutting or trimming its edges; by cold rolling the mill edges of commercial strips, stripsheets and the like and then laterally curving the same; abutting and welding its edges together to form such a tubular shaft as will result from the varying width of the commercial strip; and then working the metal, as by cold rolling, so as to form the shaft with a truely cylindrical or a tapered shape, as may be desired.

One difficulty encountered in welding the rounded edges of commercial strips resulting from hot mill operations, is the inherent irregularity or lack of uniformity therein, which prevents a proper abutment of the edges for a satisfactory welding operation; and for the purpose of the present invention, that difficulty may be partially, if not entirely, overcome by uniformly thickening, straightening or otherwise pressure shaping the metal at and adjacent to the edges to be abutted, and then holding the edges closely together and fusing the edge portions of the thickened metal to melt the same and form a welded joint with thickened metal adjacent to each side of the weld, which may be done by the method set forth in said Patent No. 1,765,368.

Another difficulty encountered in welding the edges of commercial strips, is the inherent irregular variation in the width of the strip, arising from the fact that however truely the width of the stripplate may be defined by edge rolling the same during a rough rolling operation, as set forth in the Naugle and Townsend Patent No. 1,736,324, for stripsheet manufacture, the subsequent hot and/or cold rolling operations will give the strips a considerably greater width at certain places than at other places; especially at the ends, where the lateral displacement is relatively greater than the longitudinal elongation of the metal, as compared with the intermediate portions of the strip, where the lateral displacement is relatively less than the longitudinal elongation, because of the resistance furnished by the continuity of the strip before and beyond the reducing rolls.

In any event, there may be and usually is a variation in the width of a strip at different places intermediate its end portions, resulting from differences in temperature of roll faces, and other variables well known in the art; which variations may not be avoided or remedied by a hot roughing edge rolling, or a subsequent edge straightening and thickening cold rolling operation.

For the purpose of the present invention, the difficulty of abutting and holding the edges of a commercial strip having an irregularly varying width, closely together for welding the same, may be overcome by utilizing a modified form of the expansible tube forming die shown in said Patents No. 1,746,281 and No. 1,765,384, for holding the edges closely together during the welding operation.

And finally, the tube which may thus be formed, may be of such an irregular shape and varying diameter in different portions of its length, that although it may have some commercial use either in uninhabited country regions, or at places where appearance and comparative strength may be negligible; yet the tube may not have a commercial value for use in places where true form and a high resistance to special strains and stresses are of such consequence as to require either a true cylindric or tapered tube.

For the purposes of the present invention, that ultimate requirement may be met and satisfied by utilizing a modified form of the apparatus shown in said Frahm Patent No. 1,605,828, and a modification of the method set forth in said Frahm and Riemenschneider Patent No. 1,777,-080; so as to work the metal, as by cold rolling, to change and set its molecular arrangement, to increase its elastic limit, to remove flexing strains, and especially to strengthen, straighten and true the irregularly varying diameter and shape of the tube to be either truly cylindrical or tapered, as may be desired.

More briefly, the purpose of the present improvement is to combine, coordinate and change the methods and apparatus which have been referred to, for the purpose of producing, directly from commercial strips, or stripsheets and the like, initially, an approximately cylindrical tube having an irregularly varying diameter, and ultimately, a truly cylindrical or tapered tube, by omitting or modifying some of the several operations which have heretofore been habitually employed for producing a similar product.

By so doing, the cost of producing the ultimate product is so materially reduced and its appearance and strength so materially improved and increased, that tubes made of sheet metal by the improved method are available for use in places and for purposes from which they have heretofore been excluded.

Some of the features and operations of the improved method are illustrated in the accompanying drawings, showing more or less conventionally or diagrammatically, details of apparatus by which they may be performed, in which Figure 1 is a plan view somewhat exaggerated of a commercial strip or stripsheet from which a tube may be made;

Fig. 2 is a side view of an irregular cylindrical tube made by welding together the longitudinal edges of the strip or stripsheet shown in Fig. 1;

Fig. 3 is a side view of a truly cylindrical tube made by cold rolling the tube shown in Fig. 2;

Fig. 4 is a side view of a truly tapered tube made by cold rolling the tube shown in Fig. 2, or Fig. 3;

Fig. 5 is a cross section of the tube shown in Fig. 2 taken on the line 5—5 thereof;

Fig. 6 is a cross section of the tube shown in Fig. 3 taken on the line 6—6 thereof;

Fig. 7 is a cross section of the tube shown in Fig. 4 taken on the line 7—7 thereof;

Fig. 8 is a transverse section of edge rolling mechanism by which the edges of the strip shown in Fig. 1 may be trued and thickened before welding;

Fig. 13 is a diagrammatic longitudinal section of the cold rolling machine and mandrel shown in Fig. 12;

Fig. 14 is a diagrammatic plan view of a cylindrical mandrel which may be utilized in the cold rolling machine shown in Figs. 12 and 13 to produce the tube shown in Fig. 3; and Fig. 15 is a diagrammatic plan view of a tapered mandrel which may be utilized in the cold rolling machine shown in Figs. 12 and 13 to produce the tube shown in Fig. 4.

Similar numerals refer to similar parts throughout the several figures of the drawings.

In making a tube from a commercial strip or stripsheet 16, as shown in Fig. 1, the irregular edges are somewhat trued and uniformly thickened, straightened or otherwise pressure shaped as by an edge rolling operation, as shown at 17 and 17a in Fig. 8; which may be done by cold rolling, as set forth in the Frahm and Riemenschneider Patent No. 1,765,368, or by hot rolling, as a final operation in a strip or stripsheet mill, and the same may remove some or all of the camber, whether it is done by hot or cold rolling.

Figure 9:
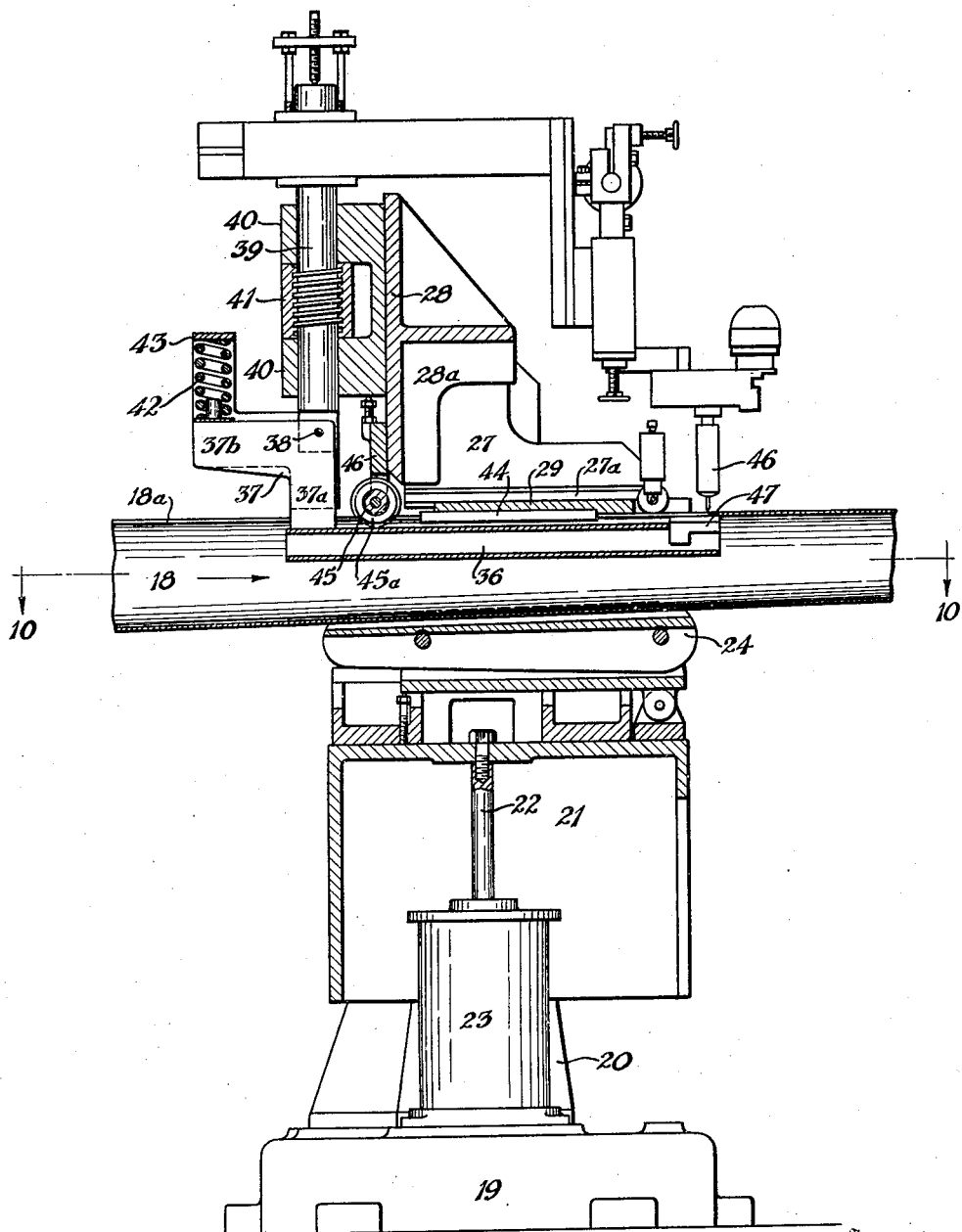
Fig. 9 is a longitudinal section of expansible tube forming means combined with welding devices.
Figure 10:
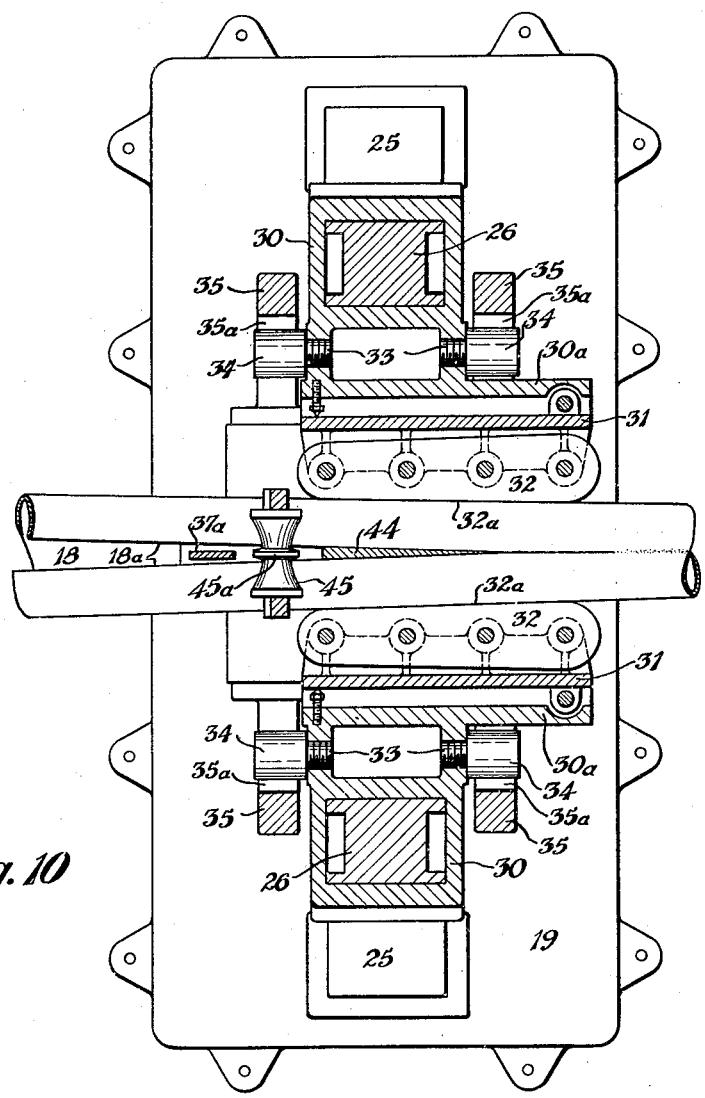
Fig. 10 is a plan section taken on line 10—10, Figs. 9 and 11.
Figure 11:
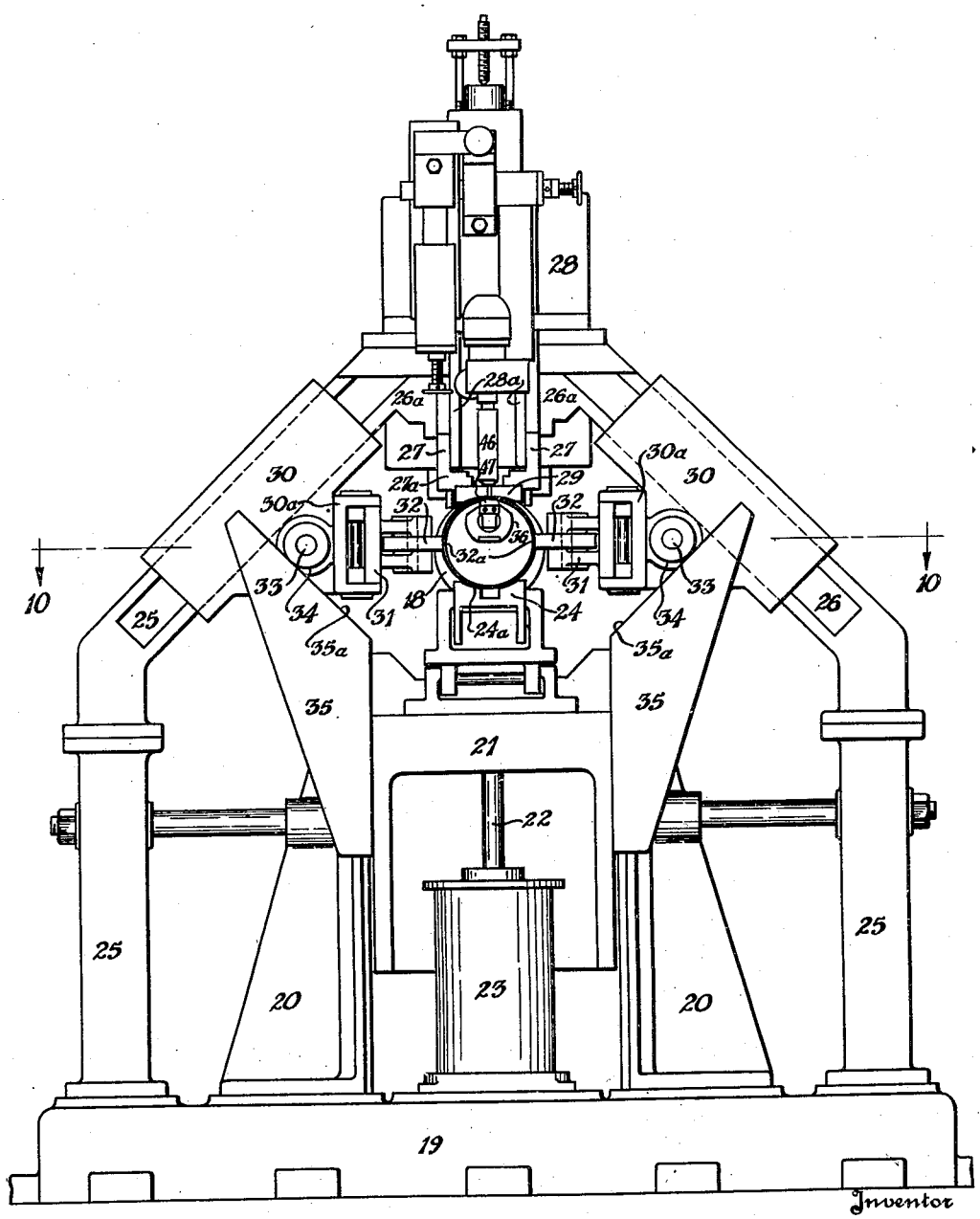
Fig. 11 is a front elevation of the devices shown in Figs. 9 and 10.
Figure 12:
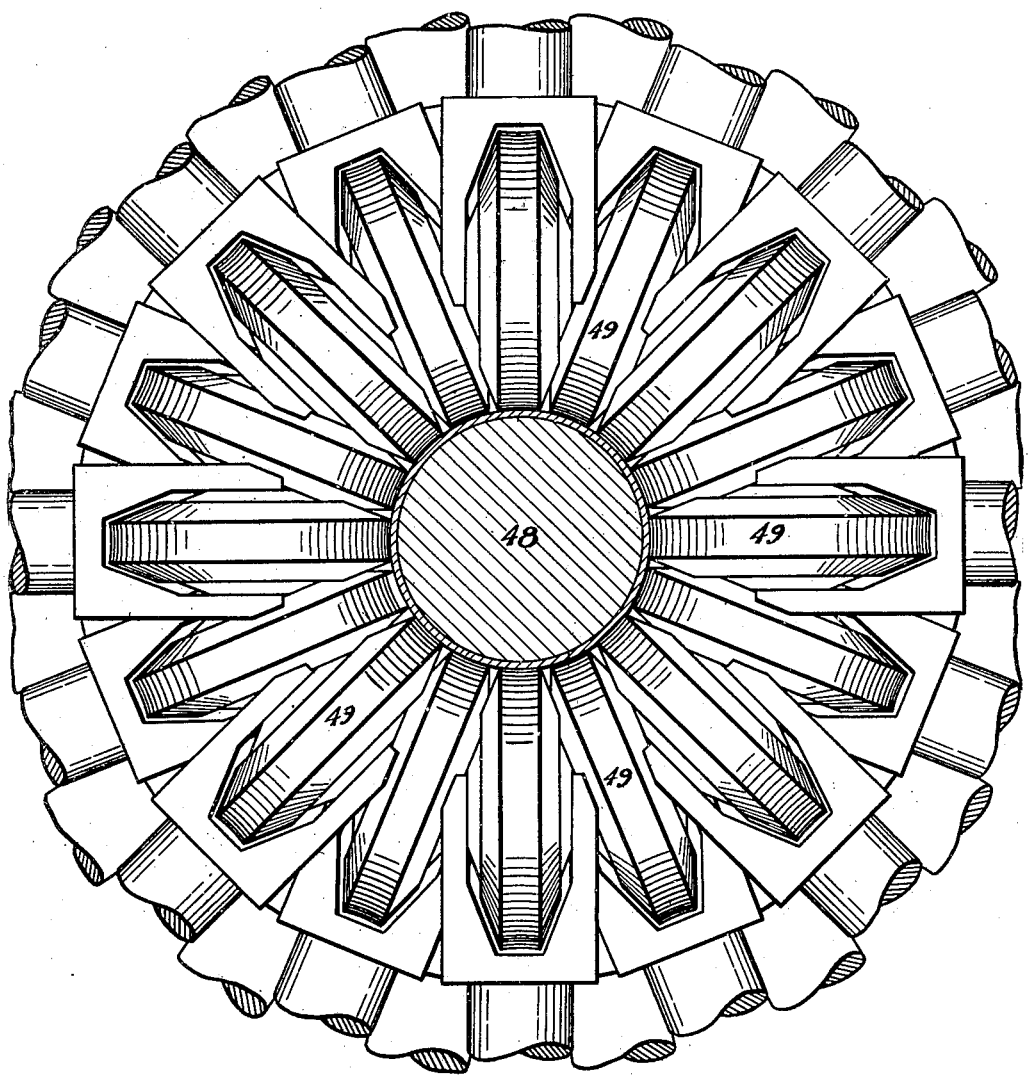
Fig. 12 is a diagrammatic cross section of a cold rolling machine and mandrel.

The strip or stripsheet is then curved laterally to approximately the form of a cylindric tube 18 with its true and thickened edges near to each other, which may be done by a forming machine of the type shown in the Riemenschneider Patents Nos. 1,746,281 or 1,765,384, at the delivery end of which is provided a yielding pressure final forming expansible die machine provided with welding means for abutting and joining the edges together, as shown in Figs. 9, 10 and 11 of the drawings herein.

As shown in those figures, the yielding pressure final forming expansible die machine may be mounted in a frame and may include a base 19 having upright guides 20 in each side thereon between which is slidably mounted an elevator carriage 21 connected to the upper end of the piston rod 22 of a fluid operated cylinder 23, which is preferably actuated by compressed air, by means of which the carriage may be raised and lowered.

A bottom die 24 is mounted on the elevator carriage 21 and is so shaped in cross section and extended in length to approximately fit the lower side of the cylindric tube when the die is raised against it by the elevator carriage, as well shown in Fig. 11.

The expansible die machine may also include the upright standards 25 mounted on each side of the base 19, the upper ends of which are inclined inward at an angle of about forty-five degrees to form the inclined guides 26 each connected at their upper ends 26a to an angle bracket 27 which in turn is connected to a flange 28a of a transverse plate bracket 28, extending across and forming the top member of the frame of the machine.

A top die 29 is secured to the lower flanges 27a of the angle brackets 27, the lower face of which die is concaved laterally to form an abutment for the top of the cylindric tube during the bringing of the adjacent edges thereof toward each other, and finally into abutment.

A sleeve 30 is mounted for sliding on each inclined guide 26, on the lower side of which sleeve is formed a longitudinal channel bracket 30a in which is adjustably mounted a supporting bracket 31 for a side die 32, the inner edge 32a of which is adapted to abut the sides of the cylindric tube.

A pintle 33 with a roller thereon projects forward and rearward from the lower side of each sliding sleeve 30, and the rollers 34 bear and ride upon the upper edges 35a of the wing brackets 35, two of which are secured on each side of the elevator bracket 21, one in front and the other in rear of the sliding sleeve 30.

The upper edges 35a of the wing brackets 35 are inclined upward and outward at an angle of about 45°, and are substantially normal to the direction of movement of the sliding sleeves 30, so that the weight of the slide guides 30 and the side dies 32 and their supporting brackets causes the sleeve to slide downward and outward on each side, so that the rollers 34 will always be supported by and ride on the inclined edges 35 of the wing brackets.

By this construction and arrangement, when the elevator carriage 21 is raised or lowered by the air cylinder, to move the lower die 24 toward and from the bottom of the cylindric tube, the wing brackets will move the rollers 34 riding thereon by a sliding upward and inward, or downward and outward of the supporting sleeves 30 to move the side dies 32 to or from the sides of the tube 18, with a corresponding movement upward or downward.

The parts are so proportioned and arranged that when the lower guide 24 is elevated and the side dies 32 are moved inward to abut the bottom and sides respectively of the tube, the adjacent edge portions on the top of the tube, are pushed against the upper die 29; whereupon a further elevation of the carriage 21 by the air cylinder will press the lower die against the bottom and the side dies against the sides of the cylindric tube, and the adjacent edges thereof are thereby pressed toward and finally into abutment with each other for welding together, as shown in Figs. 10 and 11.

The concave face 24a of the lower die 24 and the edge faces 32a of the side dies 32 are slightly inclined toward each other from the rear to the forward end of the machine, as shown in Figs. 9 and 10, so as to gradually compress the approximately formed tube 18 against the upper die and bring the adjacent edges 18a thereof together for the welding operation; and the same inclination of the lower and side dies accommodates them to the sides of a tapered tube when such a tube is initially made by the tube forming machine; the yielding pressure of the air cylinder 23 permitting the lower guide and the side guides to accommodate the larger diameter of the rear end of a tapered tube.

When, however, a cylindric tube is initially formed by the forming machine, as described above, the same dies cooperate to bring the edges of the partially formed tube together into abutment for the welding operation, and the yielding pressure of the same permits the dies to retract or expand from each other to accommodate the varying diameter of a cylindric tube arising from the varying width of the commercial strip or stripsheet from which it is made, as shown in Figs. 1 and 2.

A supporting mandrel 36 is secured at its rear end to the depending arm 37a of an L-plate 37, the angle portion of which is pivoted at 38 to the lower end of an adjustable screw of a supporting post 39 mounted in bearings 40 secured to the rear side of the transverse plate bracket 28 and adjusted upward and downward by a capstan nut 41 located between the bearings.

The rearwardly extending arm 37b of the L-plate is pressed downward by a spring 42 in a yoke bracket 43 secured to the lower end of the supporting post, the downward pressure of which tends to turn the L-plate bracket 37 as a bell crank upon its pivot 38, thereby raising the forward free end of the mandrel 36 to serve as a support for the tube at the place of the welding operation.

The mandrel is located near below the upper die 29, in the rear end portion of which is secured a depending flange or fin 44, which is tapered endwise from a relatively wide rear end to a comparatively thin forward end, as shown in Fig. 10.

A spool shaped roller 45 is journaled in a bracket 46 secured to the lower end of the transverse plate bracket 28, the body of the roller being concave between its ends for bearing upon and drawing together the adjacent edges of the partially formed tube 18, and an annular flange 45a is centrally provided on the roller for aligning the adjacent edges above the median line of the mandrel, as well shown in Fig. 10.

The partially formed tube is pushed or pulled through the expansible die machine, as by a draw bench not shown, and as it is moved forward it rides upon the lower die 24 between the side dies 32 which are actuated by the air cylinder 23 to bring the top of the tube against the upper die; and as the adjacent edges 18a have passed on opposite sides of the supporting plate 37a, they move under the concave face of the roller 45 which brings them into the same plane and centers them so as to pass on each side of the tapered flange 44; whereupon the yielding pressure of the expansible dies forces the adjacent edges 18a into abutment at the forward end of the tapered fin in position for the welding operation, which may be performed by an external arc welding tool 46 mounted above the forward end of the mandrel, upon which is provided an anvil plate 47 to form a support for the adjacent edge portions of the tube as they are welded together to form a seam, thus completing the formation seaming of a cylindric tube having a more or less irregular shape and varying diameter, as shown in Fig. 2.

The tube having an irregularly varying diameter thus formed may then be placed on the cylindric mandrel 48 in a machine of the type shown in the Frahm Patent No. 1,605,828, upon which it may be worked by the cold rolling or swaging pressure of dies 49 to straighten and smooth out the irregularities and varying diameter, of the cylindric tube; and if it is desired to form a tapered tube, the same may be done by mounting the cylindric tube upon a tapered mandrel either before or after it has been worked on a cylindric mandrel, and working it by a cold rolling or swaging operation to flow and/or draw it into the desired tapered form.

The same method may be employed in making a tapered tube directly from a tapered blank formed by slitting a strip diagonally from end to end, which give two tapered strips, each having one mill edge and another slit edge, without any loss of material; and the irregular tapered tube thus formed, as well as the irregular cylindric tube described herein, may be straight and true enough for commercial use for some purposes and/or in some places without being straightened or trued by a further working of the metal.

The cold rolling or swaging operation, when the same is employed, not only straightens and trues the metal of the tube, but also irons out the irregularities there may be in the welded seam; thus rendering it unnecessary to make a smooth seam in the edge welding operation.

Moreover, the cold rolling or swaging operation materially raises the yield point or elastic limit, and also, the ultimate tensile strength of the metal in the tube.

And the cold rolling or swaging operation not only smooths and finishes the outer surface of the tube, but also produces a very smooth and polished inner surface of the tube, which offers less frictional resistance to the flow of fluids through the tube when the tubes are used as a medium for conveying fluids, than is offered by tubes made by other methods.

The tube made from strip or stripsheet metal, in accordance with the described method, has less weight than any other metal tube of the same strength, made by other known methods; and it has greater strength than any other metal tubes of the same weight, made by other known methods.

And finally, there is no waste from the original metal which is rolled into a strip or stripsheet and made into a tube, by the improved method described herein.

In the appended claims the words "strip metal" are intended to be inclusive of metal sheets, plates, strips, stripsheets, stripplates and the like, just as though the various commercial commodities were enumerated in the several claims.

I claim:—

1. The method of making a tube from commercial strip metal having an irregularly varying width, which includes pressure shaping the mill edges of the irregular strip, then curving the irregular strip laterally and abutting and welding its edges together by a yielding pressure to form a tube of irregularly varying diameter, and then working the metal as by cold rolling the tube on a mandrel to straighten and true the same.

2. The method of making a tube from commercial strip metal having an irregularly varying width, which includes pressure shaping the mill edges of the irregular strip, then curving the irregular strip laterally and abutting and welding its edges together to form a tube of irregularly varying diameter, and then working the metal as by cold rolling the irregular tube on a cylindric mandrel to form a straight and true cylindric tube.

3. The method of making a tube from commercial strip metal having an irregularly varying width, which includes pressure shaping the mill edges of the irregular strip, then curving the irregular strip laterally and abutting and welding its edges together to form a tube of irregularly varying diameter, and then working the metal as by cold rolling the irregular tube on a tapered mandrel to form a straight and true tapered tube.

4. The method of making a tube from commercial strip metal having an irregularly varying width, which includes pressure shaping the mill edges of the irregular strip, then curving the irregular strip laterally and abutting and welding its edges together to form a tube of irregularly varying diameter, then working the metal as by cold rolling the irregular tube on a cylindric mandrel to form a straight and true cylindric tube, and then working the metal as by cold rolling the cylindric tube on a tapered mandrel to form a straight and true tapered tube.

5. The method of making a tube from strip metal having an irregularly varying width and a pressure shaped edge, which includes curving the irregular strip laterally and abutting and welding its edges together to form a tube of irregularly varying diameter, then working the metal as by cold rolling the irregular tube on a cylindric mandrel to form a straight and true cylindric tube, and then working the metal as by cold rolling the cylindric tube on a tapered mandrel to form a straight and true tapered tube.

EDMUND W. RIEMENSCHNEIDER.